Feb. 5, 1957 R. J. KUTZLER 2,780,426
AIRCRAFT CONTROL APPARATUS
Filed April 23, 1948

Inventor
ROBERT J. KUTZLER

George N. Fisher
Attorney

2,780,426
AIRCRAFT CONTROL APPARATUS

Robert J. Kutzler, Minneapolis, Minn., assignor to Minneapolis-Honeywell Regulator Company, Minneapolis, Minn., a corporation of Delaware Application April 23, 1948, Serial No. 22,841

22 Claims. (Cl. 244—77)

This invention pertains to the field of aircraft control. The apparatus embodying this invention is associated with control surfaces of the aircraft whereby the control surfaces may be operated to control the direction of flight of the aircraft.

An object of this invention is to provide improved apparatus for operating the control surfaces of an aircraft for maintaining a desired direction of flight of said aircraft. The improved apparatus for maintaining the direction of flight includes a compass which is controlled by the magnetic field of the earth whereby a base line is established by the compass. Associated with the compass is a directional gyroscope which is slaved to the compass so that its rotor axis may be aligned with the base line. The directional gyro in turn controls the position of one of two coacting control elements, the other being carried by the aircraft but also movable with respect thereto. Such control elements are utilized to unbalance a balanceable electric network that forms a part of a control arrangement which reversibly operates a motor for positioning a control surface.

A further object of this invention is to selectively alter the direction of flight of said aircraft without disassociating said magnetic compass from said directional gyro.

A further object of this invention is to selectively alter the direction of flight of said aircraft in various angular amounts but maintain a constant rate of change of direction irrespective of the amount of angular change selected.

A further object of this invention is to indicate the actual heading of the aircraft and the amount of change in heading selected in such manner that the angular values may be easily compared so that the present heading of the aircraft may be gaged with respect to its ultimate heading.

A further object of this invention is to utilize motor means for positioning a control element so that the same is displaced at a fixed rate to initiate changes in direction of flight.

A further object of this invention is to selectively limit the amount of angular movement of such motor in proportion to the angular amount of change in direction selected.

A further object of this invention is to control the amount of change in direction of flight by manually moving a control member a selected amount in proportion to the change desired without the necessity of returning such controller to an initial position.

A further object of this invention is to utilize the same motor means to position the control element carried by the aircraft thereby to obtain changes in direction of flight at selected rates of angular change.

A further object of this invention is to drive an indicator at the selected rate of change of heading and also drive an indicator at the actual rate of change in heading of the aircraft.

These and further objects of this invention may be ascertained by a study of an accompanying description of a preferred embodiment of the invention and a drawing illustrating the same.

The sole figure of the drawing is a schematic arrangement of apparatus for controlling the direction of flight of an aircraft, in a manner contemplated by the invention.

The apparatus of my invention provides three functions involving the course of an aircraft. One function is that of stabilizing the course of the aircraft on a given direction of flight. A second function is that of providing changes in the direction of flight of selected angular amounts. A third function is that of providing selected rates of change of course.

Course stabilization

The portion of the apparatus for maintaining the aircraft on its course will be initially considered.

An aircraft may maintain a desired course by operating the aileron and rudder thereof upon deviations of the aircraft from the desired course. The operated ailerons and rudder tend to return the craft to the desired course whereby the heading of the plane is stabilized on a given direction.

Figure 1:
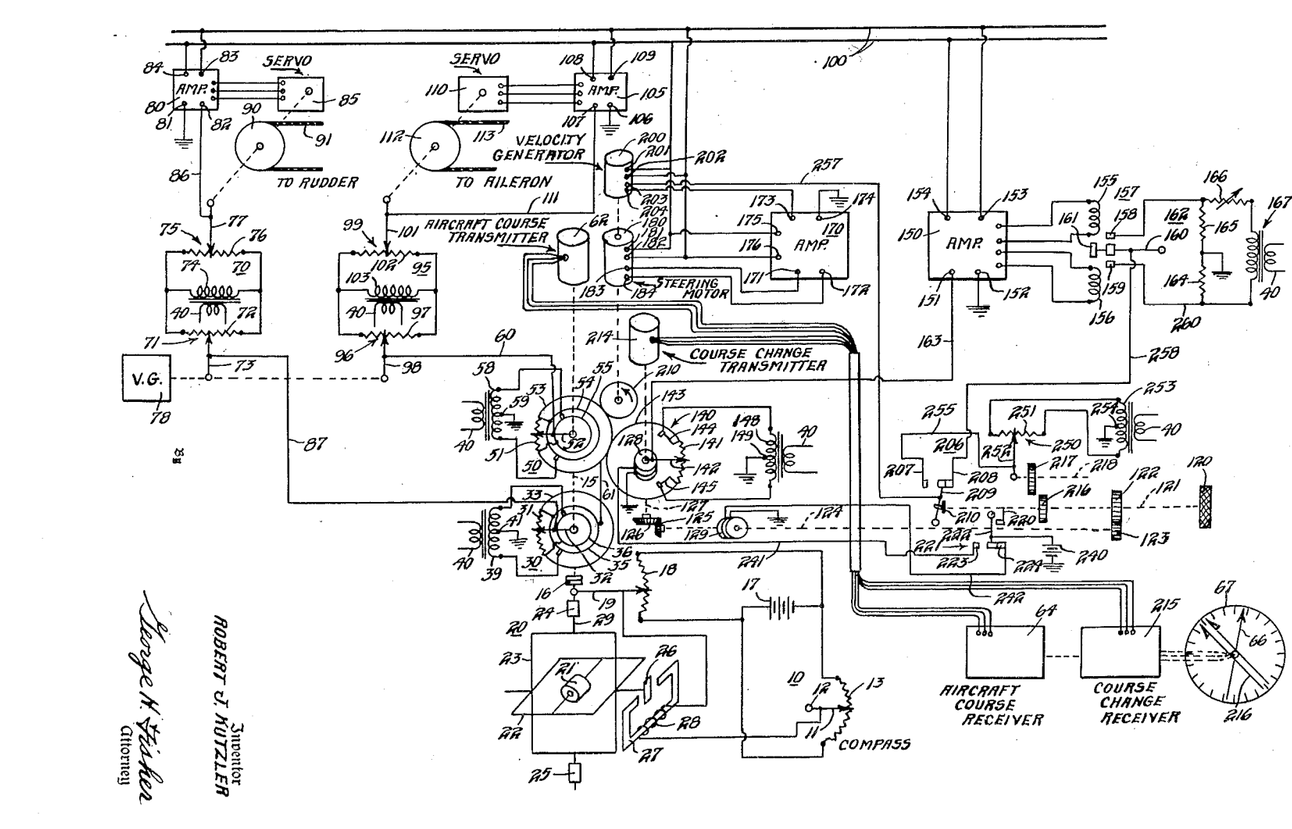

To effect the stabilization of an aircraft on a desired heading, I provide a master compass 10 which has slaved thereto a directional gyro 20. The directional gyro 20 controls the output of a directional gyro rudder potentiometer 30 and a directional gyro aileron potentiometer 50. Associated with the directional gyro rudder potentiometer 30 is a vertical gyro rudder servomotor position network 70. The potentiometer 30 and the network 70 control a rudder amplifier 80. The rudder amplifier 80 in turn controls the operation of the rudder servomotor 85. The servomotor 85 through a cable drum 90 and cables 91 positions a rudder, not shown.

Associated with the directional gyro aileron potentiometer 50 is a vertical gyro aileron servomotor position network 95. The potentiometer 50 and the network 95 control the operation of an aileron amplifier 105. The aileron amplifier 105 in turn controls the operation of an aileron servomotor 110. The servomotor 110 drives an aileron cable drum 112 which through cables 113 operates the ailerons, not shown, of the aircraft.

The master compass 10 is of the type which responds to the magnetic field of the earth. Hence, the master compass 10 may be a cathode ray compass or other type of magnetic compass. For purpose of illustration the master compass 10 is shown as a conventional magnetic compass whose needle 11 tends to align itself with the magnetic meridian of the earth. The magnetic needle 11 may be suitably carried by bearings 12 to permit its free response to the earth's magnetic field.

The slaved directional gyro 20 may be of the type having three degrees of freedom. A rotor 21 of the gyro 20 rotates on a horizontal axis carried by an inner gimbal ring 22. The inner gimbal ring 22 in turn is trunnioned about a horizontal axis in an outer vertical gimbal ring 23. The outer gimbal ring 23 is vertically supported in bearings 24 and 25 carried by the craft. The directional gyro 20 is slaved by compelling the rotor 21 thereof to alter the position of its axis. Such change of position results from a precessing movement of the directional gyro 20 about the vertical axis of the outer gimbal ring 23. To effect this precessing action, a torque applying means consisting of a magnet 26 is affixed to one trunnion of the inner cardan ring 22 and coacting therewith is an electromagnet 27 which is energized by a coil 28. When the magnet 27 is energized it tends to align the magnet 26 carried by the inner gimbal ring 22 with the magnetic field through electromagnet whereby the inner cardan ring tends to rotate about its trunnions in the outer cardan ring 23. Due to the gyroscopic effect of the rotating rotor 21, actual motion takes place about the axis of the vertical gimbal ring 23. The coil 28 may be energized in one or the other direction so that the torque applied by the magnet 27 to the magnet 26 may be in one or the other direction.

To provide for energization of coil 28 one end thereof is connected to a wiper 19 of a directional gyro operated potentiometer having a resistor 18. The opposite end of coil 28 is connected to the movable portion of the master compass 10. This movable portion may comprise the needle 11 which forms a wiper for a master compass potentiometer having a resistor 13 coacting with wiper 11. The potentiometer resistors 18 and 13 are connected in parallel across a battery 17. As thus connected the directional gyro operated potentiometer and the master compass operated potentiometer constitute a Wheatstone bridge in which the wipers 19 and 11 form the output members for the bridge. The directional gyro, the master compass, and the Wheatstone bridge constitute a self-balancing system.

An upper trunnion 29 of the directional gyro 20 is coupled by means of suitable adjustable coupling 16 to an elongatetd shaft 15 for purposes to be described.

The directional gyro rudder potentiometer 30 comprises a wiper 32 and a resistor 31. The potentiometer resistor 31 is supported in insulated relation by a circular disk 33. One end of resistor 31 is connected to an outer slip ring 35 supported by disk 33. The opposite end of resistor 31 is connected to an inner slip ring 36 also carried by disk 33. Separate brushes bear on the inner and outer rings 35 and 36 and the brushes in turn are connected to the opposite ends of a secondary winding 39. The secondary winding 39 is energized by a primary winding 40 which is connected to a suitable source of voltage such as the ship's supply or inverter not shown. A center tap 41 of secondary winding 39 is connected to ground. Wiper 32 of the directional gyro rudder potentiometer which engages resistor 31 is insulatedly carried by the aforesaid shaft 15.

The network 70 comprises a vertical gyro rudder compensating potentiometer 71 and a rudder servomotor position potentiometer 75. The potentiometer 71 has its resistor 72 connected across the opposite ends of a secondary winding 74 of a transformer having a primary winding 40. Since the secondary windings of several transformers may have a common primary winding, such primary winding is indicated in each instance by the same reference character. The servo position potentiometer 75 has its resistor connected also across the opposite ends of the secondary winding 74. A wiper 73 of the compensating potentiometer 71 may be operated over resistor 72 by means of a vertical flight gyro 78.

The vertical gyro 78 may be of any conventional type whose rotor is mounted for rotation about a vertical axis and which may also be rotated about two respectively perpendicular horizontal axes which are also perpendicular to the axis of rotation of the gyro rotor. Movement of the craft about the roll axis will cause the wiper 73 to be displaced with respect to the resistor 72. A wiper 77 of the servo-position potentiometer 75 is operatively driven by a follow up connection from the servo cable drum 90.

The amplifier 80 is provided with signal input terminals 81 and 82. Amplifier 80 has also terminals 83, 84 which are connected to a supply line 100 which in turn may be connected to a source of alternating current such as the conventional inverter (not shown) of an aircraft. The amplifier 80 is further electrically connected to servomotor 85. The amplifier 80 and servomotor 85 may be considered as a unit. This unit may be similar to that disclosed in a United States patent to Willis H. Gille et al. No. 2,425,733 or in Patent 2,425,734 in the name of Willis H. Gille et al. As disclosed in the two patents cited, a servomotor may be reversibly controlled by an amplifier depending upon the phase relationship between the voltage across the signal input terminals such as terminals 81, 82 and the voltage across the terminals 83, 84 connected to a source of supply. In the apparatus illustrated herein, therefore, the direction of rotation of rudder servomotor 85 depends upon the phase relationship between the voltage across signal input terminals 81, 82 and that across supply terminals 83, 84. The input circuit to amplifier 80 extends from terminal 82, lead 86, network 70, lead 87, potentiometer 30, center tap 41 of winding 39 to ground, and to grounded terminal 81 of amplifier 80.

The directional gyro aileron potentiometer 50 comprises a resistor 51 and a wiper 52. The resistor 51 is carried in insulated relation by a gear 53. Gear 53 also carries in insulated relation an outer slip ring 54 and an inner slip ring 55. One end of resistor 51 is connected to the outer slip ring 54 and the other end of the resistor is connected to the inner slip ring 55. Suitable brushes which bear on the slip rings are individually connected to the opposite ends of a secondary winding 58 of a transformer having a primary winding 40. Winding 58 has a center tap 59 connected to ground. The wiper 52 is carried in insulated relation by the shaft 15. A suitable driving connection 61 extends from gear 53 of the aileron potentiometer to the disk 33 of the directional gyro rudder potentiometer.

The vertical gyro and aileron servomotor network 95 comprises a vertical gyro roll axis potentiometer 96 and an aileron servomotor position potentiometer 99. The potentiometer 96 consists of a resistor 97 and a wiper 98. Potentiometer 99 comprises a resistor 102 and a wiper 101. The resistors 97 and 102 are connected in parallel across a secondary winding 103 of a transformer having a primary winding 40. Wiper 98 is operated by the vertical gyro 78 in response to movements of the aircraft about the roll axis. Wiper 10 of potentiometer 99 is operatively driven by a follow up connection from aileron servomotor cable drum 112.

Amplifier 105 is provided with signal input terminals 106, 107 and power supply terminals 108, 109. Amplifier 105 is electrically connected to aileron servomotor 110. The amplifier and servomotor unit for the aileron control is similar to the amplifier servomotor unit for the rudder control. The servomotor 110 rotates in one or the other direction depending upon the phase relationship between the voltage across signal input terminals 106, 107 and that across supply terminals 108, 109. Terminals 108, 109 are connected to line 100. Signal input terminals 106, 107 are connected to a control circuit extending from terminal 107, lead 111, wiper 101, resistor 102, resistor 97, wiper 98, lead 60, wiper 52, resistor 51, secondary 58, center tap 59 to ground, and to grounded terminal 106 of amplifier 105.

An aircraft course transmitter 62 consists of a rotor and a stator. The rotor of the transmitter 62 is driven by the shaft 15 connected to the vertical cardan ring of the directional gyro 20. Electrically associated with the transmitter 62 is an aircraft course receiver 64. The receiver 64 includes a stator and a rotor. The transmitter 62 and the receiver 64 constitute a conventional synchro transmitter and receiver in which the rotors of the transmitter and receiver may be energized by a source of alternating current. The stator windings of the transmitter and receiver are connected together. The arrangement may be similar to that used in the patent to Goddard 2,296,436. In such arrangement the rotor of the receiver follows the movements of the rotor of the transmitter. The rotor of the receiver is connected to a single pointer 66 which is associated with a graduated dial 67.

*Course change control*

Additional apparatus, which coacts with the apparatus for maintaining the aircraft on its course, which is selectively operable to change the course of the aircraft by selected angular amounts will now be considered.

Change in course is obtained by the selected operation of the ailerons and the rudder. Such operation involves a selective manually operable knob 120, a potentiometer 140 operated by the knob 120, a relay operating amplifier 150, a fixed signal network 162, a motor driven velocity signal generator 200, a steering motor amplifier 170 controlled by the network 162 and the velocity generator 200, a steering motor 180, potentiometer 30 driven by the steering motor 180, network 70, amplifier 80, and rudder servomotor 85 on the one hand and potentiometer 50 driven by the steering motor 180, network 95, amplifier 105, and aileron servomotor 110 controlled by aileron amplifier 105, on the other hand.

The potentiometer 140 comprises a resistor 141 and a wiper 142. The resistor 141 is carried in insulated relation by a gear 143 which meshes with the gear 53 of the aileron potentiometer. The gear 143 also carries insulated contact sectors 144, 145. One end of resistor 141 is connected to sector 144 and the opposite end of resistor 141 is connected to contactor to sector 145. A suitable brush bears on each sector and electrically connects the sector to one end of a secondary winding 148 of a transformer having a primary winding 40. The secondary 148 has a center tap 149 connected to ground. Wiper 142 of potentiometer 140 is carried by one element of a magnetic clutch 128. The gear 143 supports the other coacting element of magnetic clutch 128. Wiper 142 of potentiometer 140 may be positioned by manual control knob 120 through a mechanical connection including spindle 121, gear 122, gear 123, shaft 124, normally closed magnetic clutch 129, gears 125, 126, shaft 127, and the element of magnetic clutch 128 which carries wiper 142 and which is fixed to shaft 127.

Relay operating amplifier 150 may be of the type disclosed in the patent to A. P. Upton, 2,423,534, issued July 8, 1947, and is provided with signal input terminals 151, 152. Amplifier 150 has supply terminals 153, 154 which are connected to the line 100. The input terminals 151, 152 of amplifier 150 are connected to a circuit extending from terminal 151, lead 163, wiper 142 of potentiometer 140, resistor 141 of potentiometer 140, secondary winding 148, center tap 149 to ground and to grounded terminal 152 of amplifier 150.

The output of amplifier 150 is electrically connected to coils 155, 156 of relay 157. Relay 157 also includes two spaced contacts 158, 159 and an intermediate movable contact 160. The intermediate contact 160 supports in suitable relation an armature 161 which coacts with the relay coils 155, 156. Either relay coil 155 or 156 will be energized from the output of amplifier 150 depending upon the phase relationship between the input signal voltage across terminals 151, 152 and the voltage across supply terminals 153, 154.

The fixed voltage network 162 comprises a variable resistor 166, two equal resistors 164, 165, and a transformer 167. Resistors 164, 165, 166 are connected in series across the secondary winding of transformer 167 to constitute a circuit with the resistor 165 intermediate the resistors 164, 166. The transformer 167 is provided with a primary winding 40 which may be connected to the line 100. The junction of resistors 164 and 165 is connected to ground. Contact 158 of relay 157 is connected to the junction of resistors 165, 166. Contact 159 is connected to the junction of resistor 164 and the secondary winding of transformer 167. With the secondary winding energized, the voltage drops in resistors 164 and 165 are equal, and it is evident that the voltage of contact 158 with respect to ground is equal but of opposite phase to the voltage between contact 159 and ground.

Steering motor amplifier 170 whose details will be subsequently disclosed includes output terminals 171, 172, signal input terminals 173, 174, and supply terminals 175, 176.

The steering motor 180 is of the split phase condenser type and is controlled by the amplifier 170. To this end, terminals 183, 184 extending from one phase of steering motor 180 are connected to output terminals 171, 172 of amplifier 170. The other phase terminals 181, 182 of motor 180 are connected to the line 100. The amplifier and steering motor arrangement may be of the types disclosed in the application of Albert Palya et al., Serial No. 526,806, filed March 16, 1944. The direction of rotation of steering motor 180 depends upon the phase relationship between the voltage across supply terminals 175, 176 of amplifier 170 and the voltage across the amplifier signal input terminals 173, 174.

A velocity generator 200 is driven by the steering motor 180. This velocity generator may be of the type disclosed in the aforesaid application of Palya et al. While the details of this velocity generator are not shown herein yet on its exterior are the primary winding terminals 201, 202 which are connected to the line 100. The velocity generator includes secondary terminals 203, 204. Terminal 204 of velocity generator 200 is connected to one signal input terminal 173 of amplifier 170. Terminal 203 of generator 200 is connected through a single pole double throw switch 206 to the movable intermediate arm 160 of relay 157. The other signal input terminal 174 of amplifier 170 is connected to ground.

The steering motor 180 through gears 210, 53 and 143 which carries the other element of magnetic clutch 128 drives the potentiometer resistor 141 which at this time is disconnected from the wiper 142 since the magnetic clutch 128 is unenergized.

The gear 143 drives a rotor of a course change transmitter 214. The transmitter 214 has associated therewith a receiver 215 which in turn positions a double pointer 216 coacting with graduated dial 67. The course change transmitter 214 and the course change receiver 215 may be similar to the aircraft course transmitter 62 and the aircraft course receiver 64 respectively.

*Rate of course change*

Selective rates of course change are obtained from manually operable knob 120, a manually adjustable potentiometer 250, velocity signal generator 200, steering motor amplifier 170, steering motor 180, and on the one hand potentiometer 30, network 70, rudder amplifier 80, and rudder servomotor 85; and on the other hand potentiometer 50, network 95, aileron amplifier 105 and aileron servomotor 110 on the other hand.

Rate of course change is also initiated by manual knob 120 as well as selected amounts of course change. The spindle 121 which has the manual control knob 120 mounted thereon is rotatably and slidably carried in supporting means not shown. A gear 216 in addition to the gear 122 is mounted on the spindle. Gear 216 may be engaged with a further gear 217 which is carried by a counter shaft 218.

A potentiometer 250 is a source of rate of turn signal voltage. The potentiometer 250 comprises a resistor 251 having coacting therewith a wiper 252 mounted on shaft 218. The resistor 251 is connected across the ends of a secondary winding 253 of a transformer. The secondary winding 253 is energized by a primary winding 40. A center tap 254 of secondary winding 253 is connected to ground.

Spindle 121 also carries a magnetic clutch switch actuator 220. The actuator 220 is somewhat dished in form in that it has a radially extending portion mounted on shaft 218 with an axial portion parallel to shaft 218 connected therewith. Coacting with the axial portion of actuator 220 is a single pole double throw switch 221. Switch 221 comprises two spaced contacts 223, 224 with a movable pole piece 222 intermediate the contacts. The pole piece 222 may be operated by member 220 upon axial movement of spindle 121. In the normal position of spindle 121, as shown, the switch arm 222 engages contact 224. Switch arm 222 is connected to a battery 240. The opposite side of battery 240 is connected to ground. One spaced contact 223 is connected by means of lead 241 to magnetic clutch 128 of the manually operated potentiometer 140. The opposite side of clutch 128 is connected to ground. A lead 242 extends from spaced contact 224 of switch 221 to magnetic clutch 129. The opposite side of the magnetic clutch is connected to ground. The switch 221 therefore controls the energization of magnetic clutches 128 and 129. In the position of switch 221 illustrated, the magnetic clutch 128 is deenergized and the magnetic clutch 129 is energized. When switch arm 222 engages contact 223, clutch 128 is energized and clutch 129 is deenergized.

With clutch 128 deenergized, the gear 143 which carries one portion of the clutch is rotatable with respect to the wiper 142 which is carried by the other part of the clutch 128. On the other hand, with magnetic clutch 129 energized, the shaft 124 is connected through clutch 129 to gearing 125 and 126.

Spindle 121 of the manual control also includes a switch actuator 210 which may be a circular disk affixed to one end of spindle 121. The disk 210 coacts with a movable switch arm 209 of a rate of course transfer switch 206. The switch 206 is a single pole double throw switch whose switch arm 209 coacts with spaced contacts 207, 208. In normal position the switch arm 209 is to the right as shown where it engages contact 208.

*Operation under automatic stabilization*

In preparation for automatic stabilization of the aircraft on a desired heading, the elements of the apparatus are placed in a normal position to be described.

The directional gyro 20 is slaved to the magnetic meridian as determined by the master compass 10. If the axis of rotor 21 of the directional gyro is not aligned with the magnetic meridian as determined by the compass needle 11, the coil 28 will be energized to apply the proper torque until the gyro 20 has precessed to align the rotor axis with the magnetic needle 11. Such operation is derived from the Wheatstone bridge associated with the master compass 10 and the directional gyro 20. In this Wheatstone bridge, the wiper 19 operated by the directional gyro and the wiper 11 of the master compass 10 are at the centers of their respective resistors 18 and 13 when the gyro rotor 21 is aligned with the magnetic needle 11. When gyro and magnetic compass are thus aligned, the wipers 19 and 11 are at the same potential.

However, if the gyro rotor axis 21 is not aligned with the magnetic needle 11, the wipers 19 and 11 will not be at the same respective positions on their resistors 18 and 13 but will be relatively displaced. In such case there will be a potential difference between wipers 11 and 19. Since these wipers are connected to the opposite ends of the coil 28, a potential will be applied to the coil 28 which will set up a magnetic field in electromagnet 27. The electromagnet 27 will attract the magent 26 carried by a trunnion of the gimbal 22 and will tend to rotate it in one or the other direction depending upon the potential difference between wipers 19 and 11. The directional gyro 20 will precess about the axis 29 until the rotor axis of gyro rotor 21 is aligned with the magnetic needle 11 of master compass 10. The wipers 19 and 11 are then at the same electrical potential and the coil 28 will no longer be energized. At this time, the precessing movement of the gyro 20 about the vertical axis 29 will cease.

With the gyro rotor 21 in line with the magnetic meridian and the craft on the desired course, the adjustable clutch 16 will permit the spindle 15 to be rotated until the wipers 32 and 52 of potentiometers 30 and 50 are brought to the electrical centers of their resistors 31 and 51 respectively. At this time there is no potential difference between the wiper 32 of potentiometer 30 and the center tap 41 of the secondary winding 39. Similarly there is no difference of potential between wiper 52 of potentiometer 50 and the center tap 59 of secondary winding 58. The wipers 77 and 73 of the vertical gyro rudder servo network 70 will be at the electrical centers of their respective resistors 76 and 72 with no difference of potential between wipers 77 and 73. In the vertical gyro aileron and servo balance network 95, the wipers 98 and 101 will be at the electrical centers of their respective resistors 97 and 102 at which time there will be no difference of potential between wipers 98 and 101.

The input circuits associated with amplifiers 80 and 105 will therefore be in a balance condition and the amplifiers 80 and 105 will be in a normal condition. If wiper 77 in the vertical gyro rudder and servo balance network 70 be moved from the electrical center of its resistor 76 in the right direction its potential with respect to wiper 73 will increase as the wiper 77 is displaced. If wiper 77 now be moved back to its electrical center and then further moved to the left its potential with respect to wiper 73 will also increase, but will be of opposite phase to that resulting from the initial displacement to the right. The network 70 may therefore supply voltages of varying magnitudes and varying phases to the signal input circuit of amplifier 80. Similarly in the vertical gyro aileron and servo balance network 95, the movement of wiper 101 relative to wiper 98 may also provide voltages of varying magnitudes and of opposite phase. The directional gyro rudder potentiometer 30 and the directional gyro aileron potentiometer 50 may also supply voltages of varying magnitudes and of different phase to the input circuits of amplifiers 80 and 105. In the directional gyro rudder potentiometer 30 for example, with the wiper 32 at the electrical center of its resistor 31, the potential of wiper 32 and center tap 41 of secondary 39 is the same. If the resistor 31 be displaced with respect to the wiper 32 in a clockwise direction the potential between wiper 32 and the center tap will increase as the resistor 31 is moved. If the resistor 31 now be moved in the opposite direction the potential of wiper 32 with respect to the center tap 41 will decrease until the wiper 32 is at the electrical center of resistor 31 at which time there is no difference of potential between wiper 32 and center tap 41. If now continued counterclockwise motion be given to resistor 31 the potential of wiper 32 with respect to center tap 41 will increase, but will be of opposite phase from that which was originally set up between wiper 32 and center tap 41 from clockwise rotation of resistor 31. The wiper 32 and resistor 31 therefore control the signal obtained from the directional gyro rudder potentiometer 30. The resistor 31 and wiper 32 may be designated pickup elements or control elements for the potentiometer 30 which forms a source of signal voltage. The directional gyro aileron potentiometer 50 like potentiometer 30 constitutes a source of control signal voltages.

The manually adjustable knob 120 will be in its rightward position at which time the switch arm 222 contacts fixed contact 224 of switch 221 and switch arm 209 of switch 206 contacts the right contact 208.

The wiper 142 of potentiometer 140 will be at the electrical center of its resistor 141 with the potential of wiper 142 the same as that of centertap 149 of secondary winding 48.

The indicating pointers 66 and 216 will be positioned so that pointer 66 is between the double pointer elements. Pointer 66 will have been adjusted so that it points to the course of the aircraft.

In the selective rate potentiometer 250 which supplies a rate of turn signal, the wiper 252 is at the electrical center of resistor 251 at which time the wiper 252 is at the same potential as center tap 254 of secondary 253. The amplifiers 150 and 170 are at their normal points of operation.

The magnetic clutch 129 will be energized from battery 240 through a circuit extending to switch arm 222, contact 224, lead 242, clutch 129 to ground and to the grounded battery 240. The magnetic clutch 128 on the other hand will be unenergized and two parts may be rotated relative to one another. With the apparatus thus arranged, the clutch 16 may remain as adjusted.

The aircraft will now be assumed to be on its desired course or direction of flight. The directional gyro 20 being connected to the wiper 32 of the rudder potentiometer 30 and the wiper 52 of the aileron potentiometer 50 stabilizes these wipers. The resistors 31 and 51 on the other hand are carried by the aircraft although movable in some operations with respect thereto. In the automatic stabilization the resistors 31 and 51 of the rudder potentiometer 30 and the aileron potentiometer 50 respectively may be assumed to be fixed with respect to the aircraft. If the aircraft deviates from its desired course, the resistors 31 and 51 being carried by the aircraft are moved with respect to their respective wipers 32 and 52 which are stabilized in space by gyro 20.

The relative movement of wiper 32 and resistor 31 changes the potential of wiper 32 with respect to center tap 41 thereby applying a signal in the input circuit to amplifier 80. The amplifier 80 now operates and causes the rudder servomotor 85 to position the cable drum 90. Assuming that the deviation of the plane has been to the right of its desired heading, the resistor 31 will have moved clockwise with respect to wiper 32 so that the potential of wiper 32 approaches the potential of the one end of secondary winding 39. In other words, the wiper 32 in the half cycle being considered is negative with respect to the potential of center tap 41. Since wiper 32 and the remainder of the input circuit of amplifier 80 is connected with amplifier 80 above the center tap 41 which is connected to ground, a negative signal will be applied to amplifier 80. The negative signal on rudder amplifier 80 which results in the operation of rudder servomotor 85 applies movement to the drum 90 and rudder cables 91 so that left rudder is applied. The cable drum 90 moves its follow up wiper 77 until the voltage between wiper 77 and wiper 73 of network 70 is equal but opposite to the voltage between wiper 32 and center tap 41. Wiper 77 of potentiometer 75 may thus be moved toward the positive end of resistor 76 which in the present half cycle under consideration may be considered the right end of resistor 76. When equal and opposite voltages are established the input circuit to amplifier 80 is in a balanced condition and the rudder is no longer positioned.

With respect to the aileron network, the wiper 52 will be negative with respect to center tap 59 thereby applying a negative signal to aileron amplifier 105. The amplifier 105 will operate to cause the aileron servomotor 110 to drive aileron drum 112 and aileron cables 113. This operation causes the lowering of the right aileron and the raising of the left aileron. The cable drum operates its follow up wiper 101 moving it toward the right end of resistor 102 which in the present half cycle under consideration is the positive end of resistor 102. Wiper 101 is moved until equal and opposite voltages are set up in the input circuit of aileron amplifier 105 at which time the input circuit thereof is balanced and the amplifier stops operating.

While the succeeding steps during stabilized operation may be occurring concurrently they are stated in sequence in order to set out more clearly the operation involved during each step. Following the positioning of the rudder and aileron, the aircraft tilts in a leftward direction. The vertical flight gyro 78 in response to the tilting of the aircraft to the left about the roll axis moves the wiper 71 of network 70 and the wiper 96 of network 95 toward the left from the electrical centers of their resistors 72 and 97 respectively. Since in the half cycle under consideration the right ends of resistors 72 and 97 are assumed positive with respect to the left ends, it may be seen that the potential of wiper 77 with respect to wiper 71 increases in a positive direction by the movement of wiper 73 by the gyro 78. Similarly the potential of wiper 101 with respect to wiper 98 increases. The amplifier 80 therefore has a positive signal applied to it which causes it to operate rudder servomotor 85. This positive unbalance signal in the control circuit of amplifier 80 is of opposite phase from that originally set up in the input circuit of rudder amplifier 80 by the displacement of resistor 31 with respect to wiper 32. Consequently, in response to the signal voltage of a positive character which is of opposite phase from the original negative signal in the control circuit of amplifier 80, the servomotor 85 is operated to move the rudder back toward normal position. The rudder cable drum 90 moves the servo balance wiper 77 back toward the center from its right position. Wiper 77 is moved until the potential between wiper 77 and wiper 73 is equal and opposite to that between wiper 32 of potentiometer 30 and center tap 41 of winding 39.

In the aileron bridge network the potential between wiper 101 and wiper 98 leaves an unbalance positive signal in the input circuit to aileron amplifier 105 which is of opposite phase from the original signal caused by displacement of resistor 51 with respect to wiper 52 of aileron potentiometer 50. The amplifier 105 therefore causes the aileron servomotor 110 to rotate in an opposite direction whereby the ailerons are moved back toward their normal position and aileron servo balance wiper 101 is moved toward the left from its right position. Such movement of wiper 101 is continued until the potential between wiper 101 and wiper 98 is equal and opposite to that between wiper 52 and center tap 59 of secondary 58.

An aircraft in the left bank which had been assumed by the aircraft will tend to turn or change its course toward the left. As the aircraft changes its course toward the left, it approaches the desired direction of heading. At the plane approaches its desired heading, the magnitude of the deviation of the craft from its original heading decreases, consequently the resistors 31 and 51 which are carried by the aircraft tend to align the wipers with the electrical centers of their respective resistors. As the electrical centers of resistors 51 and 31 are brought toward alignment with wipers 52 and 32, the value of the negative voltage applied in the input circuit of amplifiers 80 and 105 decreases. This leaves an unbalanced voltage of positive phase in the input circuits of amplifiers 80 and 105. The rudder amplifier 80 operates rudder servomotor 85 which moves the rudder toward the right from its center position. The wiper 77 is therefore moved toward the left from the electrical center of resistor 76 until the voltage between wiper 77 and wiper 73 is equal but opposite to any voltage derived from potentiometer 30. Similarly the amplifier 105 in response to a positive voltage in its input circuit operates servomotor 110. The servomotor 110 moves its left aileron in a downward direction from its center position and raises the right aileron. The servo balance wiper 101 which is positioned with the ailerons, controls the voltage between wiper 101 and wiper 98 of network 95 so that it is equal and opposite to that voltage obtained from potentiometer 50.

The application of right rudder and lowered left aileron causes the aircraft to decrease the amount of left bank. The vertical gyro 78 responds to the decrease in the value of the left bank and moves wiper 73 of network 70 and wiper 98 of network 95 toward the right from their leftward positions. Such movements of the wiper 73 and 98 cause an unbalance negative signal to appear in the input control circuits of amplifiers 80 and 105. The amplifier 80 in response to the negative signal causes the servo motor 85 to position the rudder toward the left. In other words, while the rudder had been in a right position the negative signal moves it back toward the center position. The follow up wiper 77 is also moved to balance the input control circuit of amplifier 80.

Similarly the amplifier 105 in response to a preponderant negative voltage causes the aileron servomotor 110 to operate the aileron cable drum 112 whereby the depressed left aileron is moved back toward normal position. Similarly the follow up wiper 101 is operated to balance the input control circuit of amplifier 105.

While the amount of left bank has been decreased, it has been not entirely removed and consequently the plane continues to turn toward the left. The aircraft therefore continues to carry the resistors 31 and 51 to further bring the electrical centers of resistors 31 and 51 toward alignment with the wipers 32 and 52. The action is continuous in that decrease in the directional gyro signal from potentiometers 30 and 50 causes the application of right rudder and lower left aileron. The consequent decreasing in the bank angle causes the vertical gyro to effect operation of the servomotors 85 and 110 whereby the right rudder is moved toward the center position and the lowered left aileron is raised toward its normal position. Consequently when the aircraft has been brought back to its desired heading at which time the wipers 32 and 52 are aligned with the electrical centers of their resistors 31 and 51, the wipers 73 and 77 of network 70 are at the electrical centers of their respective resistors 72 and 76. In addition, the wipers 98 and 101 of the network 95 are also at the electrical centers of their resistors 97 and 102. The rudder and ailerons are in normal position and the craft has been stabilized on its desired heading or desired direction of flight.

During the time that the craft deviated from its desired heading the stator of aircraft course transmitter 62 which is carried by the aircraft rotated with respect to the rotor which is stabilized by the directional gyro 20. In response to the relative movement of the rotor and stator of transmittter 62 the aircraft course receiver 64 had its rotor and stator relatively displaced. The rotor of receiver 64 operates the single pointer 66 in accordance with the deviations of the aircraft. Consequently the pointer 66 at all times indicates the actual heading of the aircraft. As the aircraft moves back toward its desired heading, the aircraft course transmitter 62 causes the aircraft course receiver to move the pointer 66 back toward the desired heading.

If the deviation of the craft be to the left wipers 32 and 52 will be adjusted to provide a positive signal to initiate a turn to the right and the remaining elements coact to restore the craft to the desired heading.

*Course change operation*

The change in course may be effected in any desired amount mainly by rotating a manual knob 120 in accordance with the desired change in course to be effected. Rotation of manually operable knob 120 rotates spindle 121 and through gearings 122 and 123, magnetic clutch 129, gearings 125 and 126 and one clutch element of clutch 128 moves wiper 142 with respect to resistor 141. The direction which wiper 141 moves with respect to the electrical center of resistor 141 depends upon the direction in which the manual controller 120 has been rotated. Assuming that a turn to the left is desired, controller 120 is rotated toward the left or counter-clockwise. The wiper 142 is therefore displaced toward the counter-clockwise end of resistor 141. In the half cycle under consideration, wiper 142 as displaced is negative with respect to the center tap 149 of winding 148. With wiper 142 negative with respect to center tap 149, a negative signal is applied to amplifier 150 in a circuit extending from input terminal 151, conductor 163, wiper 142, resistor 141, secondary winding 148, center tap 149 to ground and to amplifier grounded input terminal 152. The amplifier in response to the negative signal operates relay coil 156 which attracts the armature 161. The switch arm 160 is thus brought into engagement with contact 159. The potential of switch arm 160 is therefore the same as the potential of contact 159 which is connected to the lower end of resistor 164 as shown. In the half cycle under consideration the upper end of resistor 164 may be considered positive with respect to the lower end. Consequently the switch arm 160 is negative with respect to ground. A negative signal voltage is thereby applied to amplifier 170 in a circuit extending from amplifier input terminal 173, velocity signal generator terminal 204, generator terminal 203, lead 257, switch arm 209, contact 208, lead 258, switch arm 160, contact 159, lead 260, resistor 164 to ground, and to grounded terminal 174 of amplifier 170. A negative voltage of fixed value is thereby applied to the input terminals of amplifier 170. The amplifier 170 causes the steering motor 180 to rotate in the direction indicated by the arrow on driven gear 210.

As the steering motor rotates, it also drives the secondary of velocity generator 200 with respect to the primary winding. The voltage output of velocity generator 200 is opposed to the voltage derived from network 162. The velocity generator 200 thus maintains the speed of rotation of steering motor 180 at a substantially constant value. As the speed of the motor 180 tends to increase the voltage output of the velocity generator 200 increases thereby decreasing the control signal on amplifier 170. This decrease in the control signal of amplifier 170 causes the steering motor to decrease its speed. Similarly when the steering motor speed decreases, the voltage output of the velocity generator 200 decreases at which time the opposing effect of the velocity generator signal on the signal derived from network 162 decreases. The signal input to amplifier 170 from network 162 increases causing the steering motor 180 to increase its speed. In this manner the steering motor as stated rotates at a substantially constant speed.

The steering motor as stated rotates gear 210. Gear 210 in turn rotates the gear 53 of the aileron potentiometer 50. The gear 53 through its structural connection 61 with disk 33 rotates the same. Gear 53 also drives gear 143 which supports resistor 141 of potentiometer 140. The gear 143 is rotated counter-clockwise until the electrical center of resistor 141 is aligned with the wiper 142 which had been position from manual controller 120. When the wiper 142 and the electrical center of resistor 141 are thus aligned, there is no potential difference between the wiper 142 and center tap 149. There is consequently no applied signal to the input terminals 151, 152 of amplifier 150. The relay coil 156 is deenergized permitting the switch arm 160 to move by spring means, not shown, to a position intermediate contacts 158 and 159. The network 162 is no longer connected to the input circuit of amplifier 170, consequently the amplifier 170 ceases to operate and the steering motor 180 stops rotating.

The rotation of gear 143 from steering motor 180 by means of gearing 210 and 53 is communicated to the rotor of the course change transmitter 214. The synchro course change receiver 215 responds to the relative movement of the stator and rotor of transmitter 214 and positions the double pointer 216 in accordance with the amount of movement applied to gear 143. This, as has been seen, is the same as the angular change in course selected by the controller 120.

The rotation of gear 53 by steering motor 180 displaced resistor 51 with respect to wiper 52, and in the half cycle under consideration brings the negative end of resistor 151 toward wiper 152. Wiper 52 is thus negative with respect to center tap 59 of secondary winding 58. Similarly the wiper 32 of potentiometer 30 engages the negative portion of resistor 31 whereby in the half cycle under consideration, wiper 32 becomes negative with respect to center tap 41 of secondary winding 39.

In response to the negative signal in the input circuit of aileron amplifier 105, the amplifier 105 operates the aileron servomotor 110 to lower the right aileron and raise the left aileron. The follow up wiper 101 is positioned to balance the input circuit of aileron amplifier 105. The negative signal in the input circuit of rudder amplifier 80 as obtained from potentiometer 30 causes the amplifier 80 to operate. The servomotor 85 as controlled by the rudder amplifier 80 applies left rudder and also moves the follow up wiper 77 to balance the input control circuit for rudder amplifier 80.

The application of the lowered right aileron and raised left aileron causes the aircraft to bank toward the left.

As before, when in a left bank, the vertical gyro 78 responds and moves wipers 73 and 98 toward the left setting up a positive signal on rudder amplifier 80 and aileron amplifier 105. Amplifiers 85 and 105 operate whereby the ailerons and rudder are moved toward normal position.

Considering the operation of the rudder and aileron positioning means with the steering motor 180 rotating at a constant speed, which is before the potentiometer 140 has been placed in balanced condition, it may be observed that the steering motor through gearing 210 and 53 tends to rotate the resistor 51 of potentiometer 50 in a clockwise direction with respect to the aircraft during a called for left turn. However, the aircraft is turning toward the left so that it tends to rotate the gear 53 in a counter-clockwise direction in space. These rotations are considered relative to the wiper 52 which is maintained fixed in space. If the plane is turning toward the left at a speed such that the counterclockwise rotation of gear 53 and resistor 51 due to the turning of the aircraft is equal and opposite to the clockwise rotation applied to resistor 51 and gear 53 by steering motor 180, no further operation or modifications of the position of the ailerons will be made. In other words, with the steering motor 180 rotating at a constant rate and driving the gear 53 at a constant rate in one direction and the aircraft in turn rotating the gear with respect to wiper 52 at the same speed in the opposite direction, it is apparent that the aircraft is turning toward the left at a fixed rate of change of heading.

If the aircraft be not turning to the left at the same speed as gear 53 is driven toward the right or in a clockwise direction, the resistor 51 carried by gear 53 will move with respect to wiper 52. In the operation considered, if the opposing rotation suplied the gear 53 are unequal with the rotation in the clockwise direction being greater indicating that the steering motor is rotating at a faster rate than the plane, the wiper 52 of the aileron potentiometer 50 will be moved toward the negative end of resistor 51 thereby setting up a negative signal in the input circuit of amplifier 105. This negative signal will cause the downward positioning of the right aileron and the raising of the left aileron whereby further bank is applied to the aircraft. The vertical gyro 78 responds to the increase bank and causes the aileron to be moved back toward normal position. Concomitantly with the operation of the ailerons the rudder has also been moved to the left, but in response to the vertical gyro 78, has been moved toward normal position.

Due to the increase in bank, the rate of turn of the aircraft has been increased so that the rate of turn to the left of the aircraft may cause the gear 53 to be rotated at a speed in a counterclockwise direction which is equal to the speed applied to the resistor 53 in a clockwise direction by steering motor 180. The aircraft consequently executes the change in heading at a fixed rate irrespective of the amount of course change selected. As previously stated, these rotations are considered with respect to wiper 52 on the one hand and wiper 32 of the rudder potentiometer 30 on the other hand.

During the time that the aircraft is turning the negative signal from the potentiometer 30 and the directional gyro aileron potentiometer 50 is balanced by the potential obtained in the rudder network on the other hand from the relative positions of wipers 73 and 77 and in the aileron network from the relative positions of wipers 98 and 101 of network 95.

When the steering motor has driven resistor 141 through gearings 210, 53 and 143 until the potentiometer 140 is in balanced condition with wiper 142 aligned with the electrical center of resistor 141, the steering motor 180 stops rotating as described. The steering motor 180 no longer drives the gears 53 and 33 associated with the aileron potentiometer 50 and the rudder potentiometer 30 respectively. Since the plane is in a left bank at this time, the counterclockwise rotation of resistors 51 and 31 bring the electrical centers of resistors 51 and 31 toward alignment with wipers 52 and 32. The rudder amplifier and the aileron amplifier therefore have a positive unbalance in their input control circuits. The ailerons are therefore operated to raise the right aileron and lower the left aileron. Similarly the rudder is moved toward a right position.

The aircraft responds to the lowered left aileron and decreases its left bank. As before, the vertical gyro 78 responds to the decrease in the left bank and moves its wipers 73 and 98 toward the right, thereby causing the ailerons and rudder to be moved back toward center position.

The action is continuous in that the decrease in signal from the aileron potentiometer 50 and the rudder potentiometer 30 causes a positive unbalance in the aileron and rudder amplifier input circuits which cause the application of down left aileron and right rudder. This tends to decrease the left bank position of the aircraft and to bring it toward horizontal position. The vertical gyro 78 in response to the decrease in bank moves its wipers 73 and 98 in the rudder and aileron input circuits toward the center position. When the aircraft has completed the selected change in course, the electrical centers of resistors 51 and 31 are aligned with the wipers 52 and 32, respectively. The wipers 73 and 98 are at the electrical centers of their resistors 72 and 97 and the corresponding follow up wipers 77 and 101 are also at the electrical centers of resistors 76 and 102. The input circuits of amplifiers 80 and 105 are in balanced position with the control surface in normal position and the aircraft on its new heading or direction of flight.

The aircraft course transmitter 62 has controlled its receiver 64 so that the single pointer 66 is again positioned between the elements of the double pointer 216. The relative positions of the pointers 66 and 216 may serve as a measure of the relationship between the actual course of the aircraft and the selected course of the aircraft.

*Rate turn control*

The apparatus will effect the change in heading of the aircraft either to the right or to the left at selected rates. When the course of the aircraft is to be altered at a selected rate, the manual controller 120 is moved axially initially. This axial movement causes the disk 210 to engage switch arm 209 whereby switch arm 209 engages the left contact 207 of switch 206. Concurrently, the axial movement of the spindle 121 causes the depending member 220 to engage switch arm 222 of switch 221 whereby the switch arm 222 is brought into engagement with the left contact 223 of switch 221. The gear 216 on the spindle 121 is now meshed with the gear 217 on countershaft 218. Gears 122 and 123 are disengaged during the axial movement of spindle 121. Controller 120 may now be rotated in proportion to the rate of turn at which the aircraft is to fly. Rotating controller 120 rotates gears 216, 217 and shaft 218 which drives wiper 252 of potentiometer 250.

If turning to the left be desired, the controller 120 is moved toward the left thereby moving wiper 252 toward the right end of resistor 251. The lower end of secondary winding 253 in the illustration is assumed negative with respect to the upper end in the half cycle under consideration. Consequently the wiper 252 is moved toward the negative end of resistor 251. The wiper 252 will therefore be at a lower or negative potential with respect to center tap 254 of secondary 253. The steering motor amplifier 170 now has a negative signal applied to its signal input terminals 173, 174 in a circuit extending from terminal 173, velocity signal generator terminal 204, terminal 203, lead 257, switch arm 209, left contact 207, lead 255, wiper 252, resistor 251, secondary winding 253, center tap 254, to ground and to grounded terminal 174 of steering motor amplifier 170. The steering motor amplifier 170 now has a signal applied to its input circuit which is dependent upon the amount of rotation given wiper 252 by the controller 120. The wiper 252 may be variously positioned by the controller 120 thereby setting up any desired signal voltage in the input circuit of amplifier 170.

The steering motor 180 is now operated by the amplifier 170 and rotates in the direction indicated by the arrow on driven gear 210. The steering motor 180 drives the velocity generator 200 whose secondary winding generates a voltage which is opposed to the voltage obtained from potentiometer 250. The speed at which steering motor 180 now rotates depends primarily on the signal derived from potentiometer 250. If the speed of the steering motor 180 tends to increase above the value determined by the signal voltage from potentiometer 250 the voltage from the velocity generator 200 increases and tends to decrease the control voltage applied to input terminals, 173, 174 of amplifier 170. The decrease in the control circuit signal causes the steering motor 180 to decrease its speed of rotation. Similarly, if the speed of the steering motor 180 tends to drop off, the voltage generated in velocity generator 200 falls off whereby the input circuit signal on amplifier 170 tends to approach the value obtained from potentiometer 250. This increase in the applied signal to the control terminals of amplifier 170 increases the speed of steering motor 180. The steering motor 180 rotates at a rate determined by the controlled position of wiper 252 of potentiometer 250.

The rotation of manual controller 120 has no effect on the position of wiper 142 since at this time the magnetic clutch 129 is deenergized. The magnetic clutch 128 on the other hand is energized whereby the resistor 141 carried by gear 143 and the wiper 142 are clutched together.

The steering motor 180 through the gearings 210 and 53 rotates resistor 51 in a clockwise direction with respect to wiper 52. In the half cycle under consideration, as stated, the wiper 52 therefore engages the negative portion of resistor 51 whereby wiper 52 is negative with respect to the potential of center tap 59. An unbalanced negative signal is applied to the input terminals 106, 107 of aileron amplifier 105. This negative signal causes the servomotor 110 to position the right aileron in a lower position and the left aileron in a raised position. The servomotor 10 drives the follow up wiper 101 to balance the input circuit of amplifier 105. Similarly, the wiper 52 of the rudder potentiometer 30 engages the negative end of resistor 31 to apply a negative signal in the input circuit of amplifier 80. The amplifier 80 operates the rudder servomotor 85 which applies left rudder and drives follow up wiper 77 to balance the amplifier input circuit.

In response to the applied lower right aileron and raised left aileron and the applied left rudder the aircraft banks toward the left. The vertical flight gyro 78 in turn in response to the left bank attitude of the craft about its roll axis moves wiper 73 and 98 toward the left whereby the rudder amplifier 80 has its input circuit unbalanced in a positive direction and the aileron amplifier 105 also has its input circuit unbalanced in a positive direction. The positive control signals on rudder amplifier 80 and aileron amplifier 105 causes the servos 85 and 110 to be operated whereby the rudder is moved back toward the normal position and the ailerons are moved back toward the normal position.

With the aircraft in a left bank attitude the plane tends to turn to the left at a rate depending upon the magnitude of the bank angle. The steering motor 180 rotates at a speed determined by the manual controller 120. The steering motor drives the gears 53 and 33 in a clockwise direction at a speed proportioned to the movement of controller 120. The aircraft in the operation considered turns toward the left due to its left bank position at a rate as stated in proportion to the degree of bank. Gears 53 and 33 with their respective resistors 51 and 31 are moved by the aircraft with respect to wipers 52 and 32 in a counterclockwise direction. The gears 53 and 33 on the other hand are rotated by the steering motor 180 in a clockwise direction. These rotations again are considered relative to the wipers 52 and 32 and if these rates of rotation are equal but opposite the wipers 52 and 32 after the initial displacements of the resistors 51 and 31 will not have an increase in displacement of the resistors with respect to the wipers. In other words, if the rates of rotation are equal, the potentiometers 50 and 30 will have a fixed voltage output at this time which is balanced by the respective outputs of networks 70 and 95.

If the speed of rotation of gear 53 in a counterclockwise direction with respect to wiper 52 due to the turning of the aircraft is not equal to the rate of turn in a clockwise direction applied to gear 53 by steering motor 180, the aircraft has not attained the rate of turn selected by the manual controller 120. In such case a negative signal is applied to the input terminals 106, 107 of amplifier 105 from network 50 which causes an increase in the amount of bank of the aircraft. The rudder amplifier 80 also receives a negative signal from potentiometer 30 which applies left rudder. The vertical gyro 78 responds to the increase in bank and moves wipers 73 and 98 leftward to cause the movement of the aileron and rudder back to normal position. Ultimately the rate of rotation of gear 53 due to the turning of the aircraft will be matched to the opposite direction of rotation of gear 53 as applied by steering motor 180. At this time the aircraft is changing its heading at a rate of turn which is equal to that selected by the operation of the manual controller 120. The rate of turn is maintained after once established since the rotation of steering motor 180 is substantially at a constant speed which has been selected by the manual controller 120.

The course change transmitter 214 is driven through gears 210, 53 and 143 at the same rate as is applied to the gear 53. The course change transmitter 214 operates its course change receiver 215 which drives the double pointers 216 at the same rate. The course transmitter 62 on the other hand has its stator rotated with respect to its motor due to the turning of the plane. The stator of course transmitter 62 as relatively rotated controls the course receiver 64 which drives the single pointer 66 at the actual rate of change of course of the aircraft. The single pointer 66 as always indicates the actual course of the aircraft. The rate at which the single pointer 66 moves with respect to the double pointer is a measure of whether the aircraft rotates at the rate of turn selected by the manual controller 120 which selected rate of turn is reflected in the rate at which the pointers 216 are moved.

As the aircraft reaches a desired new heading, the manual controller 120 of rate turns is moved angularly back to normal position. The wiper 252 of the rate of turn potentiometer 250 is moved back to the electrical center of resistor 251 consequently there is no signal voltage applied to the input circuit of amplifier 170 from the potentiometer 250. The amplifier 170 stops operating and the steering motor 180 ceases to rotate. With the steering motor 180 inoperative, the only angular movement given to gears 53 and 33 with respect to their wipers 52 and 32 is that due to the movement of the aircraft.

The movement of the gears 53 and 33 in the left turn of the aircraft tends to bring the electrical centers of resistors 51 and 31 into alignment with wipers 52 and 32. Such movement of the resistors causes the negative signal from potentiometers 50 and 30 to decrease in value. At this time such decrease in the negative signal in effect causes an unbalanced positive signal to be applied to the rudder amplifier 80 and the aileron amplifier 105. The amplifiers 80 and 105 operate in response to the unbalance positive signal and cause the application of right rudder and the lowering of the left aileron and the raising of the right aileron with movements of the follow up wipers 77, 101.

Under the influence of the lowered left aileron and the raised right aileron, the bank angle of the aircraft decreases. The vertical gyro 78 responds to the decrease in the bank angle and moves wipers 73 and 98 back toward the center of resistors 72 and 97, respectively. An unbalanced negative signal is applied to the input circuits of amplifiers 80 and 105 which result in the rudder and ailerons being moved back toward the center position and the networks balanced by the follow up wipers 77 and 101. The operations are continuous in that the positive signal resulting from a decreased negative signal from potentiometers 50 and 30 causes the application of right rudder, lowered left aileron and raised right aileron thereby decreasing the angle of bank of the craft. The vertical gyro 73 on the other hand responds to the decreasing in the magnitude of the bank angle and moves its wipers to set up a negative signal whereby the rudder and ailerons are moved back toward normal position. When the plane has reached its selected heading the wipers 52 and 32 are at the electrical centers of their resistors 51 and 31, respectively. Wipers 73, 98, 77 and 101 are also at the electrical centers of their respective resistors 72, 97, 102 and 76. The rudder and ailerons are in normal unoperated position.

After the manual controller 120 has been rotated to normal position it may be moved axially toward the right to place it in its normal position. The aircraft may be stabilized on its new heading by the aforesaid described stabilized control.

While the operation of the apparatus has been described which involves the positioning of the control surfaces whereby the aircraft is turned toward the left in the stabilizing operation, the selected course change operation, and in the rate of turn operation, it is understood and readily apparent that operation of the control surfaces whereby the aircraft is turned toward the right is also provided by the apparatus. The description of the operation of the control surfaces to effect a turn to the right during stabilized flight, selected course turns and selected rate turns are therefore omitted.

It may now be recognized that I have provided a novel control apparatus for an aircraft which provides three desirable functions in that it stabilizes the aircraft on a given heading, selectively changes the heading of the aircraft in desired amounts but at a fixed rate of change of heading, or changes the heading of the aircraft at variable selected values of rate of turn for the aircraft. These selected course turns are obtained at the same rate of change of course irrespective of the amount by which the heading of the aircraft is to be altered. By this arrangement, given true air-speed, the bank angle which determines the rate of change of heading is of the same value irrespective of the amount of change of heading and it therefore provides for the comfort of those in the aircraft.

While I have described one embodiment of my invention, it is conceivable that my invention may take other forms than that actually described. I therefore desire that my invention be not restricted to the form actually disclosed, but to be limited only by the hereinafter recited claims.

I claim as my invention:

1. Control apparatus for an aircraft having a control surface comprising: operating means adapted to position said control surface; control means for said operating means, said control means including a two-part controller; direction maintaining means for operating one part of said controller; means for changing the direction of said craft at various rates or in selected amounts at a constant rate including a motor; a first means for variably controlling the rate of rotation of said motor; a second means for controlling the extent of rotation of said motor at a fixed rate; a manually operable means for alternatively controlling said first and second means; and means adapted to operate the second part of the controller from said motor.

2. Control apparatus for an aircraft having a control surface, said apparatus providing direction stabilization and direction change of said craft in selected amounts, said apparatus comprising: operating means adapted to position said control surface; control means including a two part pick-off for reversibly controlling said operating means; a direction maintaining means adapted to operate one part of said pick-off in said control means; motor means; actuating means adapted to control the extent of rotation of said motor means at a fixed rate; means operated by said motor adapted to position the other part of the pick-off in said control means; manually operable means for unbalancing the said balanceable actuating means to initiate operation of said actuating means; and follow up means driven by said motor means for rebalancing said balanceable actuating means to terminate operation of said actuating means.

3. Control apparatus for an aircraft having a control surface for positioning said aircraft about an axis comprising: operating means for said control surface; a first control means for said operating means including two pick-off elements; a condition responsive device; means connecting one pick-off element to said device; a motor means; operating connection from said motor means to the other pick-off element for positioning the same relative to said one pick-up element; a second control means for said motor means; manual means for applying a selected variable signal to said second control means whereby said motor means rotates at a selected speed; alternative manually operable selective means; a controller operable by said alternative manually operable means; means operated by said controller to apply a fixed signal to said second control means; and follow up controller means driven by said motor means to terminate operation of said means operated by said controller whereby changes in the condition of said craft may be made at selected rates or in selected amounts.

4. Control apparatus for an aircraft having a control surface for positioning said aircraft about an axis comprising: reversible operating means for said control surface; a first control means for said operating means including two pick-off elements; direction maintaining means connected to one pick-off element; a reversible motor means; connections from said motor means to the other pick-off element; a second control means for said motor means including an amplifier; a source of variable potential; means for applying potential of selected phase and magnitude from said source to said amplifier for controlling the direction of rotation of said motor at various speeds; an alternative means for supplying a fixed potential of variable phase to said amplifier including a manually operable initiating controller and a follow up controller whereby said direction maintaining means maintains the craft in a desired direction which direction may be altered at selected rates or in selected amounts.

5. A heading stabilizing and heading change apparatus for an aircraft having a control surface for positioning said aircraft about an axis comprising; operating means for said control surface; control means for said operating means and including two pickup elements; direction maintaining means connected to one pickup element; motor means for positioning the other pickup element; remote craft heading direction indicating means controlled by said direction maintaining means; manually operable variable rate selective means for operating said motor means; remote desired craft heading direction indicating means controlled by said motor means; alternative means for operating said motor means at a fixed rate; a manually operable controller for initiating operation of said alternative means; and a follow up controller driven by said motor means for terminating operation of said alternative means, whereby changes in heading of the craft may be compared with selected changes in heading.

6. Control apparatus for an aircraft having a heading control member, said apparatus comprising; operating means, means for controlling said operating means including a pick-off having two coacting elements; condition responsive means connected to one element; electric motor means operatively connected to the other pick-off element; potential responsive control means for said electric motor means for connecting said electric motor means to a source of constant potential; a balanceable variable potential means for supplying a potential for operating said control means including a selective variably positionable controller and a follow up controller driven by said electric motor means, whereby said motor means rotates at a constant rate to an extent depending on the position of said variable controller.

7. Control apparatus for an aircraft having a control surface comprising: reversible operating means for said control surface; potential responsive means for controlling said operating means; a balanceable variable impedance electrical network for connecting said potential responsive means to a source of voltage; a variable impedance in said network having a pick-off comprising two coacting elements; condition responsive means connected to one element; motor means connected to said other element; selective means for operating said motor continuously at a fixed rate; an alternative means for operating said motor a selected extent, said alternative means including an initiating controller, a follow up controller driven by said motor means, and means controlled by the relative displacements of said controllers and controlling said motor means.

8. Flight direction stabilization and flight direction change apparatus for an aircraft having a control surface comprising: operating means adapted to be connected to said control surface; control means for said operating means, said control means including a controller having a two part pick-off, a direction maintaining means for stabilizing one part of said pick-off; motor means for positioning said other pick-off part relative to the stabilized part; manually operable means whose displacement may be variably adjusted; a source of constant voltage and balanceable means controlled by said manual means irrespective of its extent of displacement and by follow-up means driven by said motor means for connecting said motor means to said constant voltage source to effect operation of said motor means at a constant rate but to an extent dependent on the extent of adjustment of said manual means whereby changes in direction of flight of said aircraft may be made in selected angular amounts with all such changes being made at substantially the same rate.

9. Control apparatus for an aircraft having a control surface for controlling its direction of flight, said apparatus comprising: a directional base line instrument; a pick-off having two parts for supplying a signal upon relative displacement of said parts; operating connections from said instrument to one part; a servomotor for positioning said control surface; control means connected to said pick-off and operated by said signal; means operated by said control means for controlling the operation of said servomotor, whereby said craft is stabilized on a given course; means for changing course of said craft at selected rates or in selected angular amounts comprising a motor for positioning said other pick-off part with respect to the instrument part, an amplifier for controlling said motor and having an input control circuit; a velocity generator driven by said motor included in said circuit; a manually operable rate turn selector for supplying a voltage in said control circuit in opposition to said velocity generator voltage; an alternative manually operable course change selector for supplying a voltage signal proportional to a desired course change, a follow up voltage signal device driven by said motor; and means for combining said course change signal, said follow up signal, and said velocity generator output in said amplifier control circuit.

10. In an aircraft control system, a roll control motor, roll and yaw gyros, variable resistor means operated by the motor and the roll gyro, said variable resistor means being arranged in a bridge circuit and the motor being arranged to operate in response to the potential across the output terminals of the bridge circuit whereby control by the roll gyro is imposed upon the motor, variable means for applying a potential across said output terminals, a heading selector motor and said yaw gyro arranged to differentially operate said variable means for imposing heading selection and yaw control respectively upon the motor, and means for selectively operating said heading selector motor continuously or by predetermined increments.

11. In an aircraft control system, a roll control motor, a roll gyro and a yaw gyro, motor control means operated jointly by said roll gyro and said motor for normally maintaining the aircraft in an unbanked attitude, means for biasing said motor control means, a heading selector motor and said yaw gyro arranged to operate differentially said biasing means for imposing heading selection and yaw control respectively upon the roll control motor, and means for selectively operating said heading selector motor continuously or by predetermined increments.

12. In an aircraft control system, a roll control motor, roll and yaw gyros, variable resistor means operated by the motor and the roll gyro, said variable resistor means being arranged in a bridge circuit and the motor being arranged to operate in response to the potential across the output terminals of the bridge circuit whereby control by the roll gyro is imposed upon the motor, variable means for applying potential across said output terminals, and a heading selector motor and said yaw gyro arranged to operate said variable means differentially for respectively imposing heading selection and yaw control upon the motor.

13. In an aircraft control system, a roll control motor, a roll gyro and a yaw gyro, motor control means operated jointly by said roll gyro and said motor for normally maintaining the aircraft in an unbanked attitude, means for biasing said motor control means, and a heading selector motor and said yaw gyro arranged to differentially operate said biasing means for imposing heading selection and yaw control respectively upon the roll control motor.

14. In combination with an aircraft having a roll control motor, a variable resistor operated by said motor, a roll gyro and a variable resistor operated thereby, said variable resistors being arranged in a bridge circuit, control means for said motor responsive to the potential across the output terminals of said bridge circuit, a variable resistor arranged to apply a potential of either polarity across said bridge output terminals, and a yaw gyro and heading selector means arranged to differentially operate the last mentioned variable resistor to respectively impose automatic yaw control and selection of heading upon said motor control means.

15. In an aircraft control system, a roll control motor, a roll gyro and a yaw gyro, motor control means operated jointly by said roll gyro and said motor for normally maintaining the aircraft in an unbanked attitude, means for biasing said motor control means, and a heading selector motor having means for operating it at selected rates and said yaw gyro arranged to differentially operate said biasing means for imposing heading selection and yaw control respectively upon the roll control motor.

16. In an aircraft control system, a roll control motor, a roll gyro and a yaw gyro, motor control means operated jointly by said roll gyro and said motor for normally maintaining the aircraft in an unbanked attitude, means for biasing said motor control means, a heading selector motor and said yaw gyro arranged to operate differentially said biasing means for imposing heading selection and yaw control respectively upon the roll control motor, and means for selectively operating said heading selector motor continuously at selected rates or by predetermined increments.

17. In an automatic pilot for an aircraft, in combination: a rudder servomotor; an aileron servomotor; a heading change responsive motor means; a rate signal generator driven by said motor means; displaceable means for producing a signal corresponding to a desired rate of turn of the aircraft; means for controlling said heading change responsive motor means at said desired rate from said rate of turn producing means and said generator; a craft roll attitude responsive device; control means for said rudder and aileron servomotors; and means for differentially operating said servomotor control means from said heading change responsive motor means and said roll attitude means.

18. An automatic pilot for aircraft having roll controlling surfaces, a servomotor for operating said surfaces and signal responsive means for controlling said servomotor, a directional gyroscope, means comprising a pick-off associated with said gyroscope for providing a first or heading signal, one element thereof being connected to rotate with said gyroscope and the other element thereof being rotatably mounted on said craft, means for rotating one of said rotatable elements through an angle proportional to a desired course change of the craft from a given heading, means for providing a second signal dependent upon the angle of bank of said craft, means for supplying said first signal to said signal responsive means in a sense to cause the craft to bank and turn towards the desired course, and mean for also supplying said second signal to said signal responsive means in such sense as to oppose said first signal.

19. Control apparatus for an aircraft having aileron control surfaces for positioning said aircraft about the roll axis comprising: motor means connected to said control surfaces; control means for reversibly controlling said motor means comprising only one potential responsive amplifier; a source of variable A. C. heading error signal potential connected to said amplifier including a two-element pick-off; a craft heading responsive means operatively connected to one element to effect operation of said ailerons on relative displacement of said elements to stabilize heading; variable speed motor means operatively connected to said other element to effect various rates of rotation thereof whereby the pick-off signal determines the rate of heading change; a further control means responsive to change of potential connected to said variable speed means to control the speed thereof; a manually operable means for applying potentials of selected values to said further control means whereby said other element of said pickup may be driven at selected rates to vary the heading change rate of said craft.

20. Control apparatus for an aircraft comprising: a servo motor, control means for operating said servo motor including a pick-off having two coacting elements; direction maintaining means for operating one element, motor means adapted for operating the other element, a manually operable controller capable of both axial and rotational movements, first steering means connectible with the motor means and connected to the controller and controlled by a rotational movement thereof effective for initiating continuous operation of said motor means at a selected speed, second steering means operated by another rotational movement of said controller when axially displaced and effective for initiating operation of said motor means to an extent proportional to said other rotational movement, and follow up means driven by said motor means for opposing the effect of said manual controller, said follow up means including motor rate feedback means connected to the first steering means and having a rate effect when said first steering means is effective and said followup means including motor displacement feedback means connectible with the second steering means and having a displacement effect when said second steering means is effective, whereby when said first steering means is effective said motor means operates said one pick-off element at various speeds to provide selective rates of change in heading and whereby when said second steering means is effective said motor means operates said one pick-off element to make selective changes in heading of said aircraft.

21. In flight control apparatus for aircraft: in combination, a rudder servomotor; an aileron servomotor; a heading responsive device; a heading selector motor; a rudder servomotor control means; an aileron servomotor control means; heading error means operated by said heading responsive device and said heading selector motor for independently controlling both control means for said servomotors from said heading responsive device and said heading selector motor to thereby stabilize heading; means for producing a signal corresponding to a desired rate of turn; a generator driven by said heading selected motor; and means for controlling said heading selector motor from said turn signal producing means and said generator.

22. In an automatic pilot for an aircraft, in combination: a roll control motor; a roll attitude responsive device; a motor control means operated by said roll attitude responsive device and connected to the roll control motor for maintaining the aircraft in unbanked attitude; means for biasing said motor control means and opposed by the effect of the roll attitude device; a heading selector motor; means adjustable to any of several predetermined positions which are thereafter retained in accordance with a selected change in course for operating said heading selector motor in selected predetermined increments; a heading responsive device; and means for controlling said biasing means from the combined operation of said heading selector motor and the heading responsive device, to impose heading selection and yaw control upon the roll control motor.

References Cited in the file of this patent

UNITED STATES PATENTS

| | | |
|---|---|---|
| 1,436,280 | Minorsky | Nov. 21, 1922 |
| 2,016,857 | Fischel | Oct. 8, 1935 |
| 2,115,498 | Rieper | Apr. 26, 1938 |
| 2,177,242 | Carlson | Oct. 24, 1939 |
| 2,283,754 | Matthews | May 19, 1942 |
| 2,415,429 | Kellogg et al. | Feb. 11, 1947 |
| 2,450,907 | Newton et al. | Oct. 12, 1948 |